Oct. 17, 1961 M. J. H. STAAR 3,004,764

PHONOGRAPH APPARATUS

Filed May 16, 1956 3 Sheets-Sheet 1

Inventor:
Marcel Jules Helene Staar.
By. Carlson, Pitzner, Hubbard & Wolfe
Attys.

Oct. 17, 1961 M. J. H. STAAR 3,004,764

PHONOGRAPH APPARATUS

Filed May 16, 1956 3 Sheets-Sheet 2

Inventor:
Marcel Jules Helene Staar
By Carlson, Pitzner, Hubbard & Wolfe
Att'ys

Oct. 17, 1961 M. J. H. STAAR 3,004,764

PHONOGRAPH APPARATUS

Filed May 16, 1956 3 Sheets-Sheet 3

Inventor:
Marcel Jules Helene Staar
By Carlson, Pitzner, Hubbard & Wolfe
Att'ys 3,004,764

PHONOGRAPH APPARATUS

Marcel Jules Helene Staar, 30 Square du Solbosch, Brussels, Ixelles, Belgium

Filed May 16, 1956, Ser. No. 585,288
Claims priority, application Belgium May 27, 1955
17 Claims. (Cl. 274—9)

This invention relates to a record player and more particularly a record player entirely automatic in operation.

It is a general object of the invention to provide a record player for playing a single record in which the record to be played is movable edgewise over the record turntable, and as an incident to such movement the player is started, the record played, and at the completion of the record the player is stopped.

It is a more specific object to provide a slot type record player, that is, a record player housed completely concealed in a cabinet having a slot through which a single record to be played may be inserted edgewise and received on the record player turntable, where by means of a control member actuated by the edge of the record as it moves over the turntable, the turntable motor is switched "on," the record is held and accurately centered on the turntable, and following these operations the stylus of the tone arm is moved into engagement to play the upper side of the record.

It is a further object to provide means in such a player for at the completion of the record, raising the tone arm from the record side, shifting the tone arm back from over the turntable, releasing the means for centering the record and holding the record on the turntable, switching the turntable motor "off," and finally displacing the record on the turntable so that it projects through the slot through which it was originally inserted, conditioning the player and the control member by means of which these operations are brought about at rest and ready to receive another record.

Another important object is to provide a record player which may be mounted in a vehicle, such as an automobile, for playing records while the vehicle is moving and to this end having means tending to oppose sudden motion of the tone arm head while in record engagement, which might damage the stylus or record, caused by road shocks or sudden changes in movement of the vehicle.

Other objects and advantages will become apparent from the following description, taken together with the accompanying drawings, wherein.

Figures 1, 2, 3:
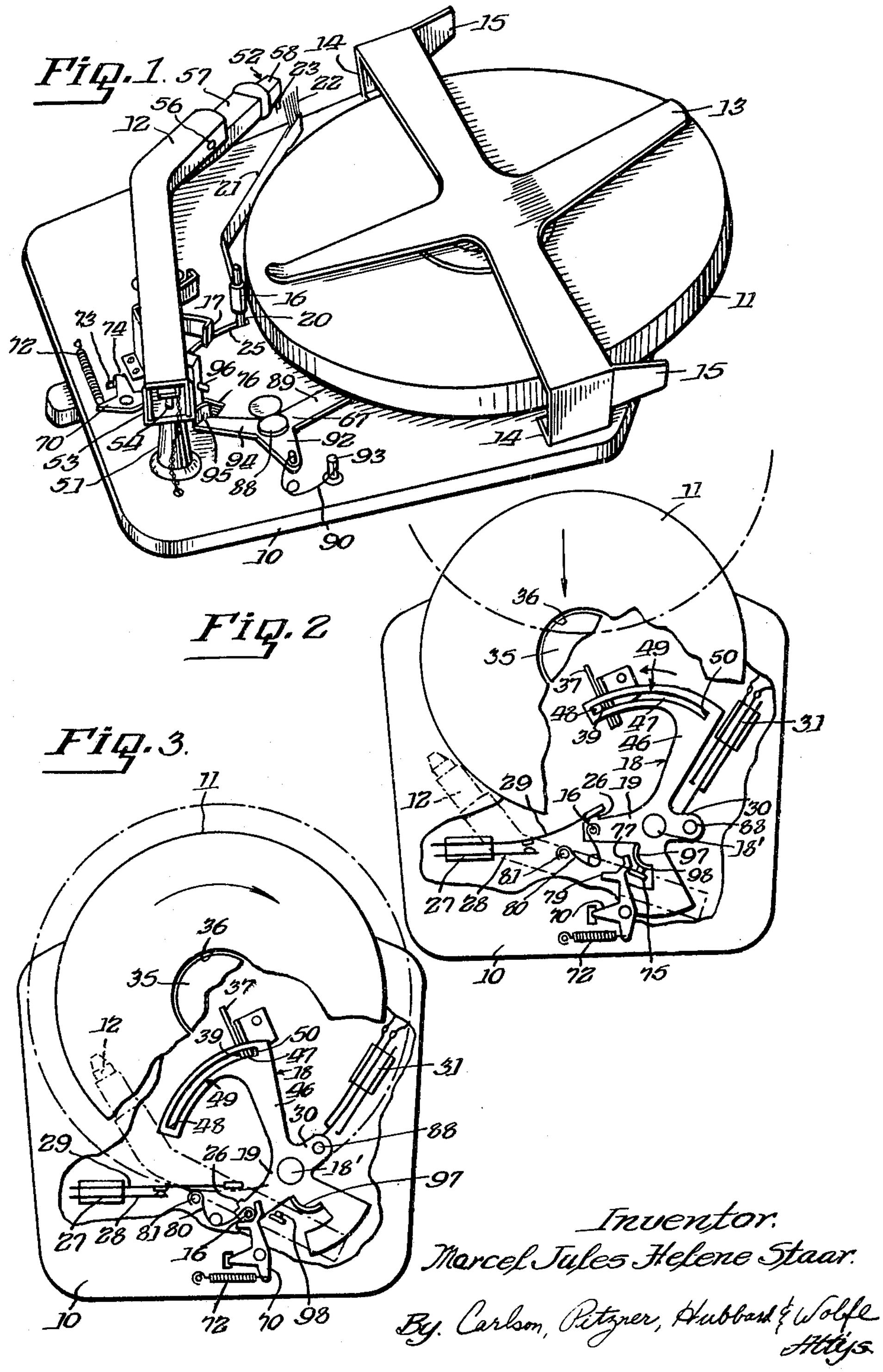
FIGURE 1 is a perspective view of a record player embodying the present invention.
FIG. 2 is a top plan view of the player illustrated in FIG. 1, with the cross, tone arm, and parts of the turntable and mounting board broken out to reveal the mechanism underneath the record turntable.
FIG. 3 is a view similar to FIG. 2 with the parts of the mechanism disposed in playing position.
Figures 8, 9, 10, 11, 12, 13, 14:
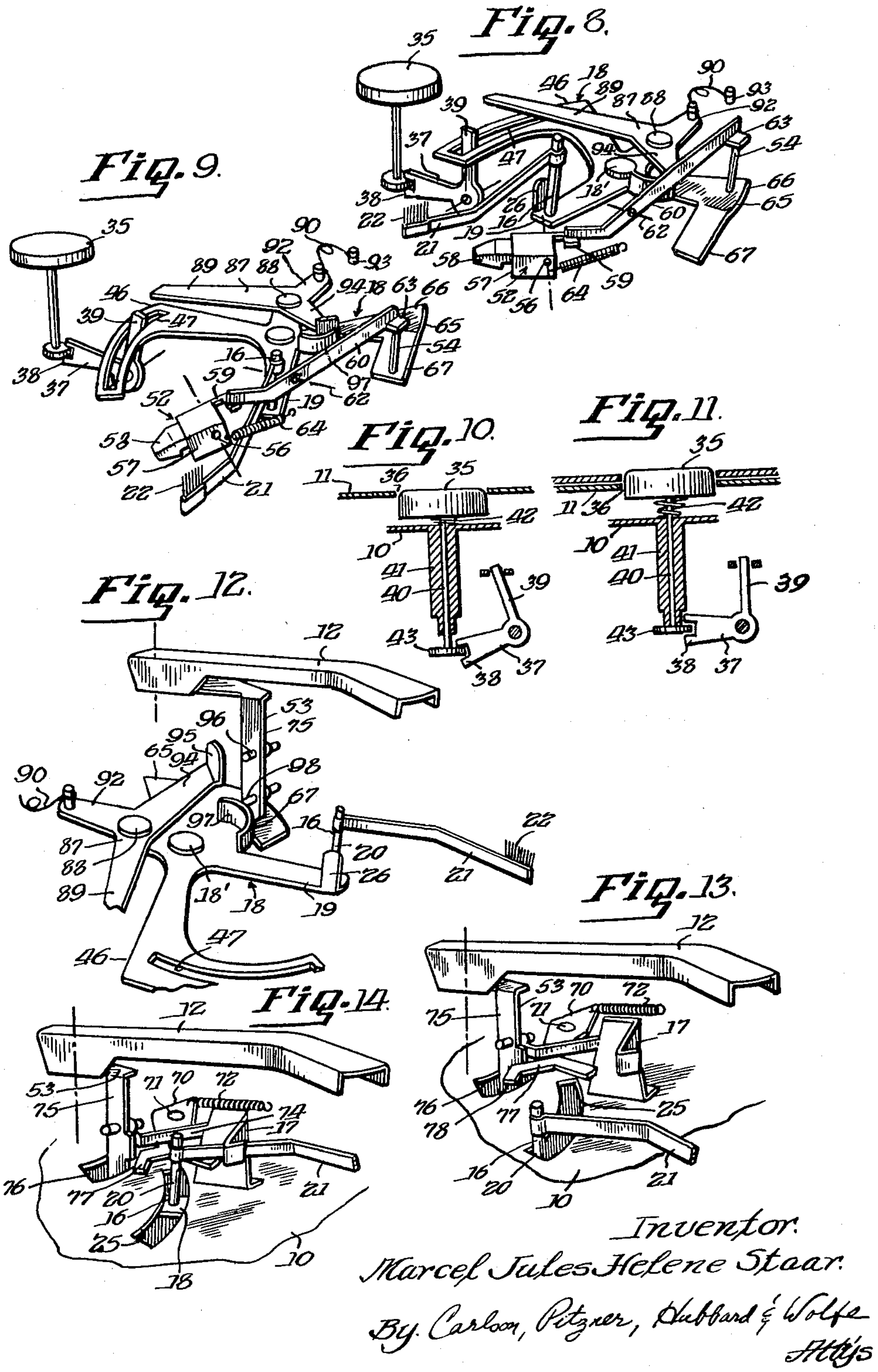
FIGS. 8 and 9 are perspective views illustrating the mechanism shown in FIGS. 2 through 5.

FIGS. 10 and 11 are sectional views of the record centering means employed in the record player shown in FIG. 1; and FIGS. 12, 13 and 14 are additional perspective views of the mechanism shown in elevation in FIGS. 2 through 5.

While the invention is susceptible of various modifications and alternative constructions, there is shown in the drawings and will be described herein in detail one illustrative form of the invention. However, it is to be understood that it is not thereby intended to limit the invention to the specific form disclosed, and it is intended to embrace all modifications, alternative constructions and equivalents falling within the spirit and scope of the invention as expressed in the claims.

Referring to FIG. 1, the slot type record player in which an exemplary form of the invention is embodied is depicted in this figure, and comprises a base or mounting board 10 on which is mounted a turntable 11 and a tone arm 12 to play a record turning on the turntable. The mounting board or base 10 is intended to be supported completely concealed behind the front of a cabinet having a slot horizontally aligned with the top surface of the turntable 11 and through which a single record of a given size may be slid edgewise into playing position on the turntable.

For example, one use for the record player illustrated might be behind the dashboard of an automobile, where the dash has a horizontal slot located conveniently to the driver for receipt of the record, the arrangement on the dashboard being such that without so much as a glance from the road, the driver may insert a record into the player. The construction and arrangement embodied in the record player and in the mechanism associated therewith is such as to bring about entirely automatically starting the full sequence of operation involved in playing a record from the apparatus through ejecting the record after it has finished playing at least partially out through the slot in the dashboard so that it may easily be removed and a new record inserted and played.

Not only are the various operations of the record player necessary as an incident to playing a record carried out in a simple and precise manner, but the record player mechanism in the form of the invention illustrated is especially adapted for employment in such a location behind the dash of a vehicle, a location imposing operational requirements more stringent and thus more difficult to meet than those imposed when the record player is housed in a stationary immovable cabinet in a permanent location such as in a home.

In keeping with the foregoing, the record player mechanism of this invention is extremely sturdy in construction and of stark simplicity, including an assemblage of stamped parts of small mass so supported in the player as to be least affected by inertial forces accompanying change of speed and sway of the vehicle.

As described hereinbefore, the player is adapted to receive a record slid edgewise in a slot to a position over the turntable. To prevent the record from being thrown above the turntable once it is centered and held in playing position, and also to locate the record laterally in position substantially in alignment with the turntable, supported on the base or mounting board 10 is a stamping formed in the manner of a cross 13 with legs overlying the top or upper surface of the turntable 11. The transverse leg of the cross 13 is equipped with end portions 14 turned under and fixed on the mounting board 10 each of which is provided with winged extensions 15 bent slightly outwardly so that as the record is slid in place it will be guided toward the center of the table.

The record player in the illustrative form shown in FIG. 1 is adapted to play a single record of a given size, in the exemplary illustration, a 45 r.p.m. record with a large diameter center hole. Furthermore, the turntable 11 is constructed with a diameter slightly smaller than the diameter of such a record, and, accordingly, with the record centered on the turntable 11, the edge of the record will overhang the edge of the turntable a slight distance. The record player is entirely automatic in its operation and the record turntable is stopped when the apparatus is "off" prior to the insertion of a record on the turntable. The record as it is slid edgewise onto the turntable as an incident to such movement starts the player operating. In the present instance this operation is accomplished by means of the record contacting an actuator 16 which is disposed in the path of movement of the record as it moves toward a position centered on the turntable 11. The actuator 16, as shown in FIG. 1, accordingly is movable by the record laterally away from the turntable from a rest position to a playing position against a stop 17, and returns to the rest position after completion of the record.

Operatively connected to the actuator 16 is a control member 18 (FIGS. 2, 8) pivotally suspended on a vertical spindle 18' underneath the mounting board 10 and thus beneath the turntable 11, for likewise advancing and returning between a rest and a playing position. The control member 18 in the course of movement from the rest to the playing position effects the various operations necessary to start the record playing.

Means are provided for the control member 18 to perform in timed sequence the operations of closing a switch in the turntable motor circuit to cause the turntable to revolve, accurately centering the record on the turntable, lowering the tone arm stylus into record engaging position, and releasing the tone arm for pivotal movement for following the stylus as it travels across the side of the record.

After the record has finished playing, a return mechanism for the control member 18 is actuated, to effect in timed sequence, the tone arm stylus to be removed from the record groove, the tone arm to be pivoted laterally from over the turntable, the centering means removed from operative engagement with the record and thus the record released, the turntable motor switch opened, and finally the record ejected partially from over the turntable to project through the slot.

Referring to FIGS. 2, 3, and 8, for example, it will be seen that the control member 18 is made from a stamping, usually from thin gauge lightweight sheet metal or plastic, and has a plurality of arms forming a symmetrical arrangement. One arm 19 may be termed the actuator arm for it bears the actuator 16 which comprises, in the present instance, a rigid pin 20 on which is fastened an elongated relatively stiff strip 21 carrying at its free end a brush 22 adapted to sweep past the stylus 23 carried by the tone arm head 24. The brush 22 automatically cleans the stylus twice each time a record is played, the first time when the actuator 16 moves from a rest to a playing position, and the second time after completion of the record upon return of the actuator to the rest position when the brush sweeps back across the tone arm head and the stylus. The pin 20 extends vertically above the control member 18 and through an arcuate slot 25 cut in the mounting board 10 and defining the path of advance and return of the actuator between its rest and playing positions.

*Turntable motor switch assembly*

The actuator arm 19 also functions to operate a switch for the turntable motor and thus, in addition to bearing the actuator pin 20 and the brush 22, is formed with a lug 26 standing vertically and lying along one edge of the arm. Laterally adjacent to the control member and supported below the mounting base or plate 10 is a turntable motor switch 27, in the present instance shown as a two-leaf switch, one shorter leaf 28 of which may be considered to be fixed, while the other longer leaf 29 of which may be considered to be flexible and operated by control member 18. As shown in FIG. 2, the control member 18 assumes a rest position where the actuator pin 20 lies adjacent the record turntable 11. The control member 18 is movable from this rest position to a playing position (FIG. 3) and first advances to the playing position to start the player and then returns after the record is finished playing to the rest position to stop the player. In the rest position of the control member 18 the lug 26 on the actuating arm 19 bears against and bends the flexible leaf 29 away from the fixed leaf 28 of the switch. Opposed facing contacts are provided on the two leaves of the switch 27 adapted when engaged to close the switch and when separated to open the switch. As the control member 18 advances from the rest to the playing position the switch 27 is so located, and the leaves thereof so arranged with respect to the control member that upon slight advance movement of the control member toward its playing position the flexible leaf 29 of the switch is released to spring toward the fixed leaf 28 and cause the switch contacts to engage. The turntable motor used to drive the turntable is not shown in the drawings, but may be conventional in form. Ordinarily a constant speed motor is used to drive the turntable with or without a governing device as demanded by the source of power available to drive the motor, and the motor may be connected in circuit with the source of power by means of the turntable motor switch 27. Closing the switch contacts thus causes the turntable motor to be energized and the record turntable revolved.

It may also be desirable to include a muting switch in the player for opening the circuit to the pickup housed in the tone arm head during the motor switching operation. Accordingly, a muting switch arm 30 may also be formed as part of the control member 18 engageable with the center leaf of a three leaf switch 31 to open the circuit to the pickup head at the instant the motor switch is operated either to open or close, in a conventional manner.

The control member 18 as it advances from the rest toward the playing position shown in FIG. 3, accordingly closes the circuit to the turntable motor, this occurring, in point of time, as an incident to initial advance of the actuator 16 toward the playing position it assumes corresponding to the playing position of the control member. In a similar manner, after the completion of the record and when the control member 18 is returned from the playing position shown in FIG. 3 to the rest position, the leaves 28, 29 of the motor switch 27 are caused to be spread and the contacts separated to open the switch.

Means are also included in the present illustrative form of the invention to accurately center the record and hold it in place on the turntable, after it has been slid into playing position on the turntable through the slot in the cabinet or the like in which the apparatus is housed.

*Record centering assembly*

In the present instance, as shown in FIGS. 10 and 11, the record centering means comprises a centering spindle 35 housed within a recess 36 provided centrally of the turntable 11 and movable vertically into the center hole of the record. As shown in FIG. 10, the centering spindle 35 is disposed below the surface of the turntable 11 and may be raised as shown in FIG. 11 above the turntable to inoperative position. For raising the spindle 35, there is included a bell crank lever 37 pivotally supported on a horizontal pin and having one arm 38 disposed in operative engagement with the spindle 35 and another arm 39 disposed to extend laterally for camming engagement with the control member 18. The spindle 35 is fastened to a pin 40 telescoped within a boss 41 integral with and depending below the mounting plate 10. As shown, a compression ring 42 is interposed between the under face of the spindle 35 and the upper face of the mounting board 10, for biasing the spindle upwardly into record engaging position. The extent to which the spindle 35 may be elevated is determined by the length of the pin 40 which is provided at its lower end with a disk 43 cooperating with the lower end of the boss 41 which acts as a stop. For operative engagement with the spindle 35, the free end of the arm 38 of the bell crank lever is forked and straddles the disk 43, as shown in FIG. 10, to provide means for lowering the centering spindle assembly into the recess 36 within the turntable and below the surface of the turntable out of operative relation with the record. As shown, with the spindle 35 extending above the surface of the turntable 10, and in operative position, a position the spindle assumes when the turntable is revolving and the record playing, the spindle 35, the pin 40 fastened to it, and the disk 43 fastened on the lower end of the pin, all revolve. With the arrangement and construction illustrated in FIG. 11, the distance between the arms of the fork on the free end of the bell crank lever arm 38 is such as to provide clearance with the disk 43 so as to permit rotation of the disk without frictional engagement with the bell crank lever arm 38 when the spindle 35 is elevated.

To effect the raising and lowering of the record centering spindle 35 the bell crank lever 37 is disposed under the turntable and is positioned to be operated by the control member 18. Accordingly, the control member 18, as shown in FIGS. 2, 3, 8 and 9, is provided with an arm 46 which may for convenience be termed the record centering arm, provided with a curved laterally projecting camming portion lying in the plane of the control member and having a curved cam slot 47 in which the tip of the other arm 39 of the bell crank lever is received. Rotation of the control member 18 as it advances between rest and playing positions through the agency of the record centering arm 46, the cam slot 47, and the camming arm 39 of the bell crank lever, effects the centering assembly to be raised and lowered to and from operative engagement with the record on the turntable. For imparting pivotal movement to the bell crank lever 37 the cam slot 47 is of non-uniform radius with respect to the spindle 18′ on which the control member 18 is supported for pivotal advance and return movement. In the present instance, the cam slot 47 is laid out along an arc of uniform radius for a certain defined limited extent, and an arc of non-uniform radius through the balance of the extent of the slot. As shown in FIGS. 2 and 3, which illustrate the control member 18 in elevation, the terminal extent of the slot 47, from the outer end 48 of the slot to approximately the point 49, is laid out along a constant radius taken from the axis of rotation of the control member 18 (the spindle 18′), and along an arc of gradually reducing radius through the balance of the extent of the cam slot 47 from the point 48 to the other or inner end 50 of the cam slot.

In the operation of the mechanism, the player is started by advancing the control member 18 from a rest position as shown in FIG. 2 to a playing position as shown in FIG. 3. During the course of such movement, while the terminal extent of the cam slot 47 is in engagement with the camming arm 39, no pivotal movement is imparted to the bell crank lever. The bell crank lever begins to pivot as the control member 18 moves to bring the inner extent of the slot 47 into operative relation with the camming arm and through this extent is effective to cause the desired pivotal motion of the bell crank lever and thus elevate the centering spindle 35.

It will thus be seen upon initial advance of the control member from a rest toward a playing position, the record centering arm 46 causes no motion to be transmitted to the record centering spindle 35. Motion is transmitted to elevate the centering spindle only after the control arm 18 has passed through substantially half of its entire advance motion toward the playing position. In contrast, upon initial advance of the control member 18, the motor switch 27 is caused to close to energize the turntable motor. It is thus to be noted that in point of time, as the player is started the motor switch 27 is closed before the record centering spindle 35 is elevated into record engaging and centering position above the turntable and a discrete interval occurs between these operations.

Means are also included in the form of the invention illustrated, for lowering the stylus carried by the tone arm into playing relation with the upper side of the record carried on the turntable.

*Tone arm assembly*

In the present instance, referring again to FIGURE 1, the player is provided with a tone arm 12 supported at one end for lateral pivotal movement by means of a post 51 rigid with the mounting board 10, and carrying at its other end a tone arm head 52 beneath which depends the stylus 23. The tone arm 12 is pivotal laterally between a rest position as shown in FIG. 1, where the tone arm head 52 and stylus 23 are supported directly above the peripheral edge of a record centered on the turnable 11, and playing positions where the stylus is over the turntable. While the tone arm 12 is pivotally supported solely for lateral movement, the tone arm head 52 is supported solely for vertical pivotal movement within the tone arm and may be lowered into record engaging position and raised from record engaging position in response to movements of the control member 18.

In the present instance, the tone arm 12 is formed from a U-shaped channel member, as shown particularly well in FIGS. 12 through 14, having fastened thereto a bracket 53 providing a flat horizontal bearing surface on the under side for resting on in bearing engagement with the mounting post 51. The pivotal support of the tone arm 12 may be provided by a pin 54 extending vertically through the post 51 from beneath the mounting board 10 and projecting above the bracket 53 to a location within the area enclosed by the side and top walls of the channel member forming the tone arm 12. This pin may also provide means for transmitting motion from the control member 19 to the tone arm head 52 for raising and lowering the tone arm head with relation to the turntable and a record carried thereon.

Accordingly, the tone arm 12 is formed in the conventional manner with a short terminal extent bent toward the turntable 11. Within this short terminal extent of the tone arm, the tone arm head 52 is pivotally mounted by means of a pin 56 disposed transversely of the tone arm and providing a horizontal axis about which the tone arm head may pivot. As shown in FIGS. 8 and 9, the tone arm head 52 includes a sleeve 57 carrying a cartridge-type pickup 58 in which the stylus 23 is fastened, and having a trailing arm 59 extending behind the sleeve and within the tone arm. This trailing arm is provided for engagement by a pivotally mounted bar 60 supported within the tone arm 12 upon a transversely disposed pin providing a horizontal axis 62 about which the bar 60 may pivot. At the end of the bar 60 remote from the tone arm head, the bar is formed with a laterally extending lug 63 adapted to rest on the vertically extending pin 54 supported within the post 51 and depending below the mounting board for engagement by the control member 18. As appears in FIGS. 8 and 9, the location of the pivotal axis 62 lengthwise of the bar 60 is such as to afford a mechanical advantage greater than 1 in the elevation of the head 52 by the pin 54. Thus the length of the lever arm from the lug 63 on the end of the bar 60 is, as shown, greater than the length of the lever arm from the axis 62 to the end of the bar engaging the arm 59 carried by the head.

The control member is provided with a tone arm head actuating arm 65 which, as shown in FIGS. 8 and 9, includes a radially extending portion 66 and a tangentially extending portion 67 which lies inclined with relation to the plane of the control member 18.

Raising and lowering of the tone arm head stylus from and toward the upper side of a record on the turntable may be accomplished by advancing and returning the control member 18 between its rest and playing positions and by way of the tone arm head actuating arm 65. The rest position of the control member 18 is shown in FIG. 8. While in this position, the vertical pin 54 telescoped within the post 51 and extending into the interior of the tone arm 12, is raised by the tone arm head actuating arm 65 to pivot the distal end of the bar 60 down. Engaging as it does the trailing portion 59 of the carrier part 57 of the tone arm head, the bar 60 thus pivots the tone arm head about the pin 56 in such a manner as to raise the pickup cartridge 58 and stylus 23 above the upper side of a record on the turntable.

Advancing the control member 18 toward the playing position, the control member 18 being shown during a late stage in such advance motion in FIG. 9, brings the tangential portion 67 of the tone arm head actuating arm 65 into operative engagement with the vertical pin 54. In order for such movement of the control member 18 to cause the pickup cartridge 58 to drop toward the turntable, this tangential portion 67 is inclined below the radial portion 66 of the tone arm head actuating arm 65. Thus as this tangential portion 67 of the arm 65 slides under the pin 54, the pin is enabled to drop. The distal end of the bar 60 is accordingly elevated, allowing a spring 64 fastened to the pickup cartridge carrier 58 and to the tone arm 12 itself, to pivot the tone arm head 52 downwardly to lower the stylus 23 into position to engage a record on the turntable.

The lowering of the stylus 23 toward the turntable occurs in sequence with the elevation of the record centering disk 35 into operative engagement with the record on the turntable, so that the record centering disc is raised above the turntable surface and received, at least partially, in the record hole at the instant when the stylus 23 is lowered into position to rest on the record. With the record centered, the stylus 23 enters the groove at the outer peripheral edge of the record.

In order to provide this sequence, with a discrete interval between the operations of centering and engaging the stylus, the arrangement is such that the control member 18 advances substantially half way toward the playing position before the stylus 23 lowers to any appreciable extent toward the record side. This is effected by providing substantial lateral extent for the radial portion 66 of the tone arm head actuating arm 65, which initially engages the pin 54, and gradually lowering the pickup cartridge by means of the inclined tangential portion 67 of the arm after, in point of time, the camming arm 39 of the bell crank lever 37 enters the inner extent of the cam slot 47 of the centering spindle actuating arm 46 to effect elevation of the centering spindle.

As mentioned previously, the tone arm head is supported solely for pivotal vertical movement, while the tone arm itself is supported solely for lateral movement with relation to the record turntable. Accordingly, in the present instance, in the period the control member 18 advances from the rest toward the playing position, the tone arm 12 is restrained against lateral movement so as to enable the stylus 23 to lower into operative engagement with the record and enter the record groove at the very peripheral edge of the record.

In the illustrative form of the invention shown in the drawings (FIGS. 13 and 14), the tone arm 12 is prevented from lateral movement during advance of the control member 18 toward the playing position by means of a latch 70 supported on top of the mounting board 10 for pivotal movement about a spindle 71 fixedly located in the mounting board 10. This latch 70 at one end is anchored to a tension spring 72 which in turn is fastened to the mounting board 10 and exerts a resilient force tending to rotate the latch 70 clockwise about its pivot to the extent permitted by a short slot 73 (FIG. 5) in the mounting board 10 into which depends a lug 74 carried by the latch 70. The tension spring 72 operates to urge the bifurcated free end of the latch 70 into engagement along one lateral edge with the tone arm assembly. As mentioned previously, the tone arm is provided with a bracket 53 which presents a bearing surface for the upper edge of the supporting post 51. This bracket 53 also includes a depending arm 75 which extends downwardly through an arcuate slot 76 provided in the mounting board 10 and in proximate relation to the latch 70. On the upper surface of the mounting board 10 a stop 17 is provided as described previously in connection with the actuating arm 16, fixed to the board and extending laterally for engagement by the depending arm 75 carried by the bracket 53 fastened to the tone arm 12. The rest position of the tone arm 12 is determined by this stop 17 against which the depending portion 75 of the bracket 53 abuts when the tone arm is in its rest position located laterally of the turntable.

For latching the tone arm assembly and restraining the tone arm 12 against lateral movement until the stylus 23 is located in the record groove, the latch 70 provides a latching arm 77 which extends laterally and then is bent angularly with respect thereto to present a shoulder 78 behind which the edge of the bracket 53 will locate when abutting against the stop 17. Until released, the latch 70 under the action of the tension spring 72 holds the bracket 53 and thus the tone arm 12 in this position.

Accordingly, as the control member 18 advances from the rest to the playing position, the tone arm 12 which while in its rest position abuts against the stop 17 is restrained from following movements of the control member 18 by means of the latch 70 which is resiliently biased to catch and hold the bracket 53, and more specifically the portion 75 depending therefrom against the stop 17.

Means are also provided in the illustrative form of the invention shown, for releasing the latch 70 in proper sequence, at a discrete interval after the control member 18 has operated to lower the stylus of the tone arm head into the record groove, to enable the tone arm to pivot laterally and follow the stylus as it moves across the record side.

In the present instance, the actuator 16 rigidly supported on the control member 18, in the final instant of movement of the control member to its ultimate playing position, engages the latch member 70 to pivot the latch member away from the tone arm assembly. To carry out this operation, the bifurcated end of the latch member 70, in addition to carrying the latch arm 77, also carries the release arm 79, which lies in the path of movement of the actuator 16 as it travels toward the ultimate position it assumes in the end of the arcuate slot 25 and against the stop 17, corresponding to the ultimate playing position of the control member 18. The actuator 16 as it reaches the final stage of its movement engages the inside inclined edge of the release arm 79 and by such engagement pivots the latch 70 away from the tone arm assembly. FIG. 14 illustrates the latch 70 as it is being pivoted away by the actuator 16 from operative engagement with the bracket 53 fastened to the tone arm 12, while FIG. 13 illustrates the latch 70 resiliently urged by the spring 72 toward the tone arm assembly and with the lateral edge of the latch arm 77 bearing against the edge of the bracket 53 to hold the tone arm 12 against the stop 17.

*The starting operation*

To start the record player, a record is slid edgewise over the turntable engaging the actuator 16 which is moved by the record laterally away from the turntable following an arcuate path as defined by the slot 25 in the mounting board. The actuator 16 is fastened for imparting movement to the control member 18 suspended below the turntable and beneath the mounting board 10. Under the urging of the actuator the control member 18 is caused to advance from a rest position toward a playing position and in the course of such movement effects in timed sequence, the motor switch 27 to be closed to energize the turntable motor, the centering disk 35 to be raised into operative engagement with the record on the turntable and accurately centering the same, the tone arm head 12 to be pivoted to lower the stylus 23 in the pickup cartridge into the record groove around the peripheral edge of the upper side of the record, and finally, the tone arm itself released so that it may pivot laterally over the turntable as the stylus travels across the upper side of the record in the record grooves.

Referring to FIGS. 2, and 3, the dash-dot lines shown on these figures to indicate the record moving edgewise onto the turntable, illustrate that the record is oversize as compared with the diameter of the turntable 11. Thus when the record is centered on the turntable, the actuator 16 is moved laterally a distance determined by the extent of overhang of the record on the turntable. In the present instance, the record is not employed to shift the actuator 16 (and the control member 18) the entire distance from its rest to its ultimate playing position but is only employed to shift the actuator partially toward its ultimate playing position. For accomplishing the remaining movement, and also for accomplishing the remaining movement of the control member from the intermediate position corresponding to the said intermediate position of the actuating pin to its ultimate playing position, in the present instance a snap type spring 80 is used, a leaf spring with a loop provided therein, as shown in elevation in FIGS. 2 through 7.

One end of the snap spring 80 is bent around the pin 20 of the actuator 16 while the other end of the spring is bent around a pin 81 supported rigid with the mounting board 10 underneath the board so that the spring is concealed and protected. The pin 81 to which the spring 80 is anchored is so located to give an over center snap action to the spring such that as the actuator 16 arrives under the urging of the record to a position just below the peripheral edge of the record, the spring functions to continue the advance of the actuator and thus the control member 18 toward its ultimate position. In the rest position of the actuator 16 and the control member 18 as shown in FIG. 2, the spring 80 by reason of its form and arrangement operates to restrain movement of the control member and the actuator against the urging of the record. Thus as the actuator is advanced by the record toward its ultimate playing position, initially the spring 80 opposes such movement, and the spring force reverses to continue the advance of the actuator and the control member toward the ultimate playing position substantially at the final instant of movement of the actuator under the urging of the record. As a practical matter, the spring 80 is so arranged as to snap over center and then continue the advance of the control member 18 toward the playing position at some intermediate point in the movement of the actuator under the urging of the record. In general, therefore, it may be said that the actuator is advanced initially by the edge of the record as it moves over the turntable and the advance of the actuator 16 (and thus the control member 18) is completed under the urging of the snap spring 80 employed in the player for that purpose.

It will also be noted that during the initial stage of advance of the actuator 16 and the control member 18, under the urging of the record, very little resistance to motion is encountered, for as noted previously during this initial period of advance only the turntable motor switch 27 and the muting switch 31 are operated, the turntable centering assembly remaining immobile until substantially half of the total advance movement of the control member has taken place. During the later stages of advance of the control member 18, the spring 80 provides the energy for effecting the various operations. Thus the spring 80 is required to be sufficiently strong to move the control member through the final stage to the ultimate playing position. In the initial stage of advance of the control member 18 the muting switch 31 is operated to open the circuit to the pickup head, and a moderate amount of force is required to spring the center leaf of this switch into engagement with the cooperating switch leaf. During this same stage, however, the flexible leaf 29 of the turntable motor switch 27 acts to assist advance of the control member 18, the forces on the control member attributable to the two switches substantially cancelling and leaving only frictional resistance and the force of the snap spring so to be overcome to move the actuator 16.

During the later stage of advance of the control member, the spring 80 having snapped over center, acts to force the control member to its final playing position. In the course of such movement, the record centering assembly 35 is operated, offering resistance to movement of the control member, the latch member 70 is pivoted away from engagement with the tone arm assembly, also offering resistance (although slight) to movement of the control member, and the tone arm head 52 is lowered into record engaging position. The latter operation actually serves somewhat to assist advance of the control member, due to the tension spring 64 fastened to the tone arm head, and the force attributable to this spring which acts on the control member through the linkage including the bar 60, the pin 54, and the camming surface on the tone arm head actuating arm 65.

It is to be noted, therefore, that the arrangement and construction in addition to performing the various operations incident to starting the player in a very efficacious manner, incorporates the various assemblies in such a way as to present the very minimum of resistance, frictional or otherwise, to motion of the control member. In fact, certain of the assemblies, namely the muting switch and tone arm assist the advance of the control member, effectively cancelling out in substantial part the resistance to motion offered by the other assemblies. The spring 80 as a consequence, may be a relatively slight spring, and when tripped supplies energy to smoothly and evenly move the overall mechanism to start the player.

*Return assembly*

With the turntable revolving and the tone arm free to pivot laterally over the turntable as the stylus in the tone arm head travels across the side of the record, the entire record side may be played by means of an amplifier system connected to the pickup cartridge by means of leads connected to the terminals of the muting switch 31. Means are provided in the record player for automatically stopping the player at the completion of the record by returning the control member 18 to its rest position.

Figures 4, 5, 6, 7:
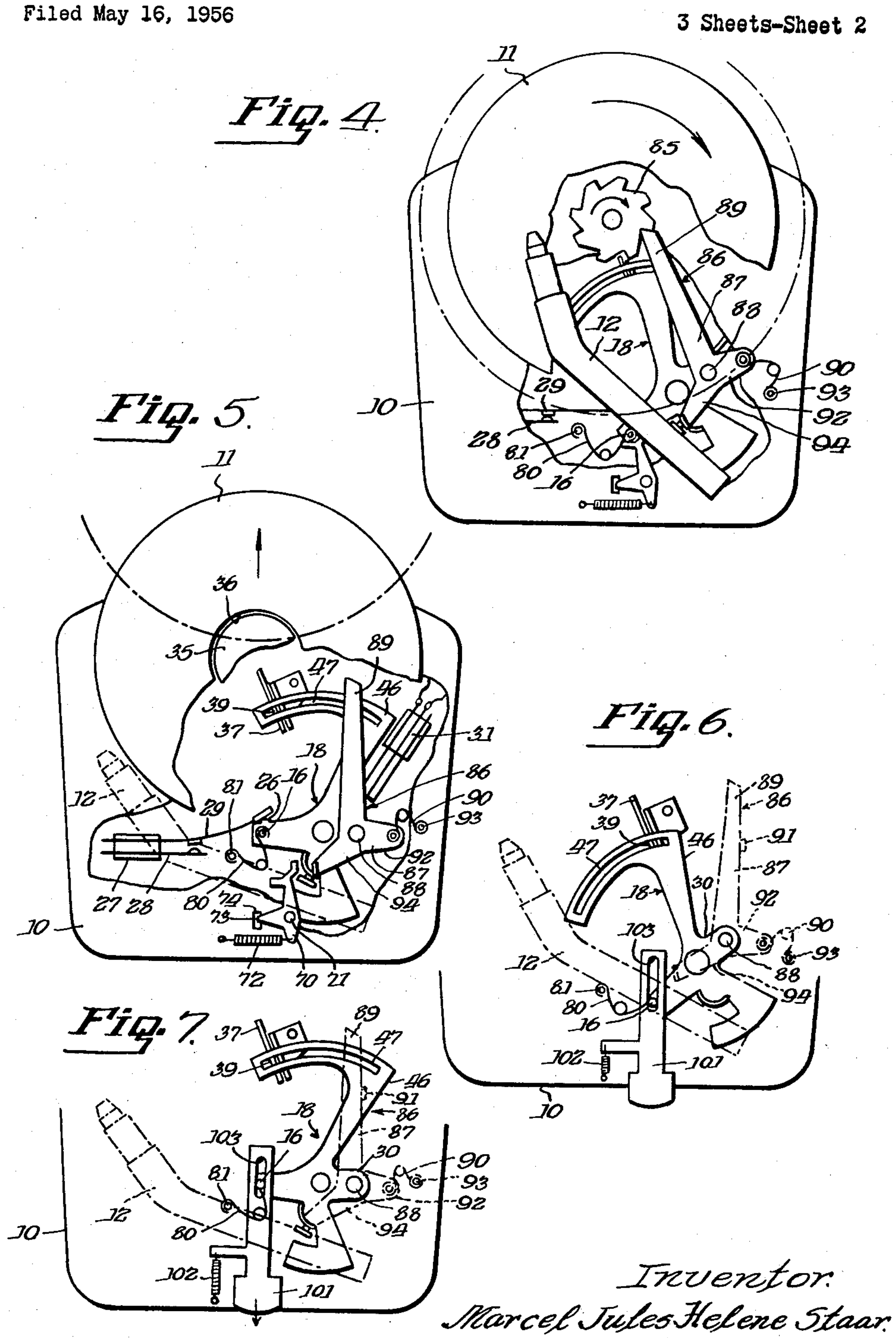
FIG. 4 is a like view with the tone arm included.
FIG. 5 is a view like FIG. 4, with the mechanism parts disposed in the rest position.
FIGS. 6 and 7 illustrate a manual control lever associated with the mechanism shown in FIGS. 2 through 5.

For carrying the foregoing into effect, as shown in FIG. 4, on the turntable spindle there is mounted for rotation therewith a cog wheel 85 adapted to engage and shift a linkage assembly 86 fastened to the control member 18. The linkage assembly 86 includes a Y-shaped lever 87 (FIG. 12) pivotally supported on the mounting board 10 by means of a shaft or the like 88 fastened to the control member 18. For transmitting motion from the cog wheel 85 to the control member 18, the Y-lever 87 has a leg 89 adapted for engagement with the cog wheel 85 as shown in FIG. 4. As the control member 18 advances from its rest to its playing positions, as shown in FIGS. 5 and 6, the Y-lever 87 is shifted so that the leg 89 thereof moves longitudinally to a position laterally adjacent the cog wheel 85 (not shown in these figures) constrained to follow such movement by the action of a spring 90 exerting a slight torsional force tending to maintain the leg 89 against a stop 91 (FIG. 6) fastened on the mounting board 10 and lying underneath the turntable 11. To position the Y-lever in operative engagement with the cog wheel it is necessary for the leg 89 of the Y-lever to pivot slightly counterclockwise until the pointed free end thereof engages between adjacent teeth of the cog wheel. To control the movement of the Y-lever 87, the Y-lever is provided with a spring arm 92 having fastened thereto the spring 90 which is anchored at its other end to a post or pin 93. The spring 90 is a torsion spring in the present instance, having a snap over center action, and so arranged as to exert a clockwise force on the Y-lever only while the Y-lever is shifted toward the position shown in FIG. 6, where it is conditioned for engagement with the cog wheel 85, this position also corresponding with the playing position of the control member 18. Having reached this position, the spring 90 is located substantially on center so that any tendency to pivot the Y-lever 87 counterclockwise causes the spring 90 to continue the advance of the Y-lever in that direction. Correspondingly, only a very slight force is necessary to pivot the Y-lever and cause the pointed end of the leg 89 of this lever to be brought into engagement with the cog wheel 85. Such slight force may be imparted to the Y-lever 87, as in the present instance, by the tone arm 12. Accordingly, a tone arm actuating arm 94 is provided on the Y-lever 87 extending toward the tone arm assembly. The end of this tone arm actuating arm is bent up to provide an ear 95, as shown in FIG. 12, presenting a vertical bearing surface for engagement by a screw threaded pin 96 mounted in a tapped opening provided therefor in the depending portion 75 of the bracket 53 fastened to the tone arm 12. Thus as the tone arm pivots laterally toward the center of the record on the turntable, the depending portion of the bracket 53 gradually approaches the tone arm actuating arm 94. When the tone arm 12 reaches the end of the record groove close to the center hole of the record the pin 96 is brought into engagement against the tone arm actuating arm 94 and a slight force is imparted to this arm and thus to the Y-lever tending to rotate the Y-lever counterclockwise.

The screw threaded pin 96 is provided to enable adjustment of the pin within the bracket 53 to adjust the point at which such counterclockwise motion is imparted to the Y-lever 87, and as will appear hereinafter, thus adjust the instant when the control member 18 begins its return toward the rest position.

As the Y-lever 87 pivots counterclockwise, due to the action of the snap spring 90, as described previously, the Y-lever pivots until the tip of the elongated leg 89 is inserted between adjacent teeth of the cog wheel 85 which is revolving with the turntable motor and turntable. The configuration of the cog wheel teeth is such that, as shown in FIG. 4, movement substantially longitudinally or axially of the leg 89 of the Y-lever 87 is imparted to this leg upon continued rotation of the cog wheel 85 after the tip of the arm has been inserted between adjacent teeth. Thus force is transmitted to the Y-lever and through the connection to the control member for rotating the control member clockwise about its pivotal support or spindle 18' in a direction toward its rest position.

Sufficient motion is transmitted to the control member 18 by means of the Y-lever 87, to return the control member partially toward its rest position. In the present instance the control member is returned positively by the cog wheel 85 to a position where the actuator 16 engages the edge of the record on the turntable, and partially shifts the record from over the turntable toward the slot through which it was originally inserted. The cog wheel tooth engaging the end of the leg 89 of the Y-lever has then rotated far enough to clear the end of this leg and the leg is then free to move. The Y-lever is then pivoted laterally to rest against the stop 91.

Completion of the movement of the control member 18 to its rest position is accomplished by means of the snap spring 80 fastened to the actuator. This spring thus acts not only to complete the movement of the control member 18 to its rest position, but also to bring the actuator 16 to its rest position and in the course of such movement shift the record on the turntable further toward the slot through which it is inserted so that it projects partially through the slot.

*The stopping operation*

In the course of the return movement of the control member 18 to its rest position, the operations required to stop the record player are also effected.

In some respects these operations are the converse of those that were performed by the control member 18 as it was advanced from a rest to a playing position to start the record player. Thus, during the initial period of return movement of the control member 18, the inner portion of the cam slot 47 in the record centering arm 46 is effective to pivot the bell crank lever 37 and lower the centering spindle 35 out of operative engagement with the record and thus release the record so that it may partake of the movement of the actuator 16 as it moves into engagement with the edge of the record and shifts the record toward the slot through which it was originally inserted.

As the control member 18 returns toward its rest position, the tone arm head actuating arm 65 functions to raise the stylus 23 out of operative and playing relation with the upper side of the record.

Accordingly, as perhaps best appears in FIGS. 8 and 9, as the control member 18 returns from the position shown in FIG. 9 to that shown in FIG. 8, the tangential and inclined portion 67 of the tone arm head actuating arm 65 slides under the vertical pin 54, elevating the pin gradually as the control member pivots, which by means of the bar 60 is translated into pivotal movement of the tone arm head and pickup cartridge in a direction to raise the stylus out of playing relation with the record by means of the bar 60. It will be noted that in point of time, the raising of the tone arm head is accomplished immediately upon the control member 18 beginning its return movement. Furthermore, the slope of the tangential portion 67 of the tone arm head actuating arm 65 is such as to elevate the stylus quickly out of the record groove and out of operative relation with the record and upon only a short extent of pivotal movement of the control member 18, in order to eliminate interference between the record and the stylus once the return movement of the control member has commenced.

After the control member 18 has pivoted in its return movement sufficiently to raise the stylus from the record, an actuating flange 97 carried by the control member 18 is employed for positively pivoting the tone arm 12 itself laterally toward rest position adjacent the turntable.

This flange is curved to present an outer camming surface for engagement with the lower end of the depending portion 75 of the bracket 53 fastened to the tone arm. With the control member 18 positioned in its playing position, as shown in FIG. 6, the tone arm 12 is freely pivotal laterally between the rest position and a position over the turntable where the stylus is located within the groove provided on the upper side of the record. Upon return movement of the control member 18 the camming surface provided by the curved actuating flange 97 engages against a pin 98 rigidly supported in the depending portion 75 of the bracket 53, causing the tone arm to be pivoted laterally toward its rest position adjacent the edge of the turntable.

As the tone arm returns to its rest position under the actuation of the control member, as shown in FIG. 14, the bracket 53 first meets the latch arm 77 carried by the latch 70. The latch 70 is free to move, provided the slight spring force exerted by the spring 72 is overcome. Thus the tone arm 12 engages and the shifts the latch 70 slightly so as to enable the bracket 53 to reach its final position abutting the stop 17 carried on the mounting board 10. As the edge of the depending portion 75 of the bracket slides past the latch arm 77, the latch pivots and following this movement, due to the action of the spring 72 shifts back to a position shown in FIG. 13, where the latch arm 77 actually catches the edge of the bracket 53 for holding the tone arm in its rest position abutting the stop 17.

In addition to lowering the record centering assembly into operative position with a record on the turntable; raising the stylus from operative playing relation with the upper side of the record; and pivoting the tone arm laterally toward its rest position adjacent the lateral edge of the turntable (as previously described); the control member 18 in its return movement also operates to open the muting switch 31 and thus opens the circuit to the pickup cartridge, and in the very final stage of its movement toward rest position opens the turntable motor switch 27.

The action of the control member 18 in operating the muting switch 31 and the turntable motor switch 27 is substantially the converse of the actions of the control member which were performed as an incident to starting the record player. Accordingly, the muting switch actuating arm 30 as an incident to return movement of the control member 18 releases the center leaf of the muting switch 31, which springs away from the contact leaf of the switch to a position against the stop leaf as shown in FIG. 2. In the present instance, this operation occurs while the control member 18 is under the positive actuation imparted by the cog wheel 85.

As described previously, under the action of the turntable motor and the cog wheel 85, the control member 18 is returned to a position where the snap spring 80 functions to complete the movement of the control member to its rest position. Preferably some instant just following disengagement of the cog wheel 85 from the Y-lever, and after the snap spring has swung over center and is functioning to complete the return movement of the control member 19, the lug 26 on the actuating arm 19 of the control member engaging the flexible leaf 29 of the turntable motor switch 27, bends this flexible leaf to an extent sufficient to separate the contacts carried on this flexible leaf and the fixed leaf 28 of the switch. Thus while the snap spring 80 completes the return movement of the control member 18, and simultaneously shifts the record on the turntable toward and through the slot, the circuit to the turntable motor is opened by means of the switch 27 and the turntable motor is stopped.

The record under the urging of the actuator 16, having been ejected partially out through the slot in the cabinet in which the record player is housed, projects to be grasped and removed from the player. The control member 18 having completed its return movement has conditioned the mechanism for receipt of another record.

As an additional feature to the arrangement and construction described hereinbefore, means are also provided as shown in FIGS. 6 and 7 to manually "reject" a record playing on the apparatus to cause the player to stop and the record to be ejected sometime during the playing period and before the record has finished playing..

As shown in FIGS. 6 and 7, beneath the turntable there may be mounted a handle 101 having a pin and slot connection with the actuator 16 carried by the control member 18, and supported for longitudinal or axial movement without interfering with the normal movement of the control member 18.

As shown in FIG. 6, the handle 101 is biased by means of a tension spring 102 to project outwardly beyond the mounting board 10 and normally would be located in a position accessible to the operator of the apparatus. The handle 101 is supported under the mounting board 10 to be manually shifted axially to engage the actuator 16 so as to return the actuator from the playing position to the rest position, and thus return manually the control member 18 from its playing to its rest position. Accordingly, as shown in FIG. 6, the handle 16 is so located that the end of the elongated slot 103 therein receives the actuator 16 when the control member 18 is in its playing position as shown in FIG. 6. Pushing the handle 101 in toward the mounting board 10, when the control member 18 is in this position, causes the actuator 16 to be shifted and thus the control member 18 to be shifted in a direction to return the control member to its rest position. This may be performed manually by pressing the end of the handle in toward the mounting board 10. Upon release of the handle 101, the handle is automatically returned to its position projecting from under the turntable by means of the spring 102, the handle being shown in an intermediate stage of such movement in FIG. 7.

This assembly provides manual means for returning the control member 18 to its rest from its playing position, and in the course of such movement as previously described, the various operations involved in stopping the record player are automatically effected.

I claim as my invention:

1. In a motor driven record player having a record turntable and a tone arm for playing the record, and adapted to receive a single record slid edgewise into playing position on the turntable, said tone arm being supported for lateral pivotal movement from a rest position adjacent the turntable positioned vertically above the peripheral edge of the record on the turntable to a playing position over the turntable, the combination comprising, an actuator disposed in the path of movement of the record and arranged to advance and return in a continuous movement in the same direction between a rest and a playing position, said actuator in the playing position being free from engagement with the record, said actuator being adapted to be advanced partially toward the playing position by the record as it is inserted over the turntable, a turntable motor switch assembly, a record centering assembly, means coupling said actuator and said assemblies for operating the same in timed sequence whereby to energize the turntable motor and cause the turntable to revolve, and to center and hold the record on the turntable, means independent of said turntable motor for completing the advance of said actuator to the playing position, a tone arm head pivotally carried by the tone arm for movement between a record engaging position and an elevated position above the record, tone arm head actuating means for raising and lowering said tone arm head relative to a record on the turntable, tone arm restraining means normally holding the tone arm in its rest position adjacent the turntable, and means coupling said actuator to said tone arm head actuating means and to said restraining means for operating the same by said actuator in timed sequence as an incident to the completion of the advance of said actuator to the playing position whereby to lower the tone arm head into playing relation with the record and after said playing relation has been attained to release the tone arm for travel across the record side.

2. In a record player having a motor driven record turntable of a given diameter and a tone arm for playing the record, and adapted to receive a single record of relatively larger diameter than the turntable slid edgewise into playing position on the turntable and overhanging the edge of the turntable, said tone arm having a rest position adjacent the edge of a record in playing position on the turntable, the combination comprising, a control member suspended below the turntable to pivot about a vertical axis and arranged to advance and return between a rest and a playing position, an actuator disposed in the path of movement of the record and connected to the control member for advancing the same toward the playing position, said actuator positioned to be advanced by said record in a continuous movement in the same direction between a rest position substantially adjacent the turntable and a playing position spaced from the turntable and free from engagement with the record corresponding to the rest and playing positions of the control member, whereby the control member is advanced toward the playing position, spring means operatively connected to said control member for completing the advance of said member to the playing position independently of said turntable motor, a motor switch assembly, said switch assembly being mounted for engagement by said control member as an incident to initial advance thereof toward the playing position thus effecting the turntable to revolve, a record centering assembly carried by the turntable and connected to the control member, said record centering assembly having means arranged to center the record on the turntable in playing position in response to further advance of the control member toward the playing position, a tone arm head carried by the tone arm to be pivotable into a record engaging position while said tone arm is in said rest position, means connecting said control member with said tone arm head to pivot the same in a record engaging position upon still further advancing movement of the control member toward the said playing position, means supporting said tone arm for lateral pivotal movement from a rest position adjacent the turntable and with the tone arm head over the edge of the record to a playing position over the turntable, and means responsive to the tone arm reaching a position adjacent the center of the turntable after the record has finished playing for returning the control member to its rest position.

3. In a slot type record player having a motor driven record turntable and a tone arm, and adapted to receive a single record slid edgewise through the slot into playing position on the turntable, the combination comprising, a control member suspended below the turntable to pivot about a vertical axis and arranged to shift in a continuous movement in the same direction between a rest position and a playing position, an actuator rigidly carried by said control member, said actuator extending vertically adjacent the turntable and arranged to be engaged and displaced laterally away from the turntable by the record to pivot the control member from its rest toward its playing position as an incident to the record sliding into playing position on the turntable, means operable by said control member for accurately centering the record on the turntable and holding the record against lateral displacement, a turntable motor switch, means operable by said control member for turning the turntable motor switch "on" and thus effecting the turntable to revolve, means for effecting operative engagement between the tone arm and the record, means for returning the control member to its rest position after the record has finished playing, means effective as an incident to such return movement of the control member for carrying out the operations of: (1) removing the tone arm from operative engagement with the record, (2) turning the turntable motor switch "off," and (3) releasing the record and removing the centering means from operative engagement therewith, in the order stated for said operations with a discrete interval between each operation, and means for displacing the record partially from over the turntable to project the record through the slot in which it was originally inserted, said latter means comprising the actuator carried by the control member engaging the edge of the record upon return of the control member to the rest position.

4. In a slot type record player having a motor driven record turntable and a tone arm for playing the record, and adapted to receive a single record slid edgewise through the slot into playing position over the turntable, the combination comprising, a control member suspended below the turntable to pivot about a vertical axis and arranged to advance and return in a continuous movement in the same direction between a rest and a playing position, an actuator disposed in the path of movement of the record and connected to the control member for advancing the same toward the playing position, said actuator having rest and playing positions corresponding to the like positions of the control member and being adapted to advance the control member partially toward the playing position by the record as it is inserted over the turntable, spring means operatively connected to said control member for completing the advance of said member toward the playing position independently of said turntable motor, a motor switch assembly, said switch assembly being mounted for engagement by said control member as an incident to advance thereof toward the playing position thus effecting the turntable motor to be energized and the turntable to revolve, a record centering assembly carried by the turntable and connected to the control member, said record centering assembly having means arranged to center the record on the turntable in playing position as the control member advances to the playing position, tone arm restraining means coacting with said actuator to normally hold the tone arm in its rest position adjacent the turntable, a tone arm head pivotally carried by the tone arm to assume a record playing relation with respect to the record while said tone arm is in said rest position, said tone arm head upon advance movement of the control member being lowered to engage the record, said tone arm restraining means having further means arranged with respect to said control member so as to release said tone arm after said playing relation of said tone arm head has been attained, means supporting said tone arm for lateral pivotal movement from said rest position adjacent the turntable and with the tone arm head over the edge of the record to a playing position over the turntable, and means for returning the control member to the rest position after the record has finished playing, to effect in timed sequence elevation of the tone arm head with relation to the record, return pivotal movement of the tone arm to the rest position and withdrawal of said record centering assembly from operative position to center the record on the turntable, opening of said motor switch assembly thus de-energizing the turntable motor and stopping the turntable, said actuator being effective to displace the record partially from over the turn table to project the record through the slot in which it was originally inserted upon return movement of the control member to the rest position of the same.

5. In a slot type record player having a motor driven record turntable and a tone arm for playing the record, and adapted to receive a single record slid edgewise through the slot into playing position on the turntable, the combination comprising, a control member suspended below the turntable to pivot about a vertical axis and arranged to advance and return in a continuous movement in the same direction between a rest and a playing position, an actuator disposed in the path of movement of the record, said actuator having rest and playing positions corresponding to the like positions of the control member and positioned to advance the control member partially toward its playing position by the record as it is inserted over the turntable toward playing position, spring means operatively connected to said control member for completing the advance of said member to the playing position independently of the operation of said motor, a motor switch assembly, said switch assembly being mounted for operation by said control member as as incident to initial advance thereof toward the playing position for energizing the turntable motor and causing the turntable to revolve, a tone arm head carried by the tone arm to be pivotable between a record engaging position and an elevated position above the record, means operatively connecting the control member and said tone arm head for lowering the tone arm head into playing relation upon further advance movement of the control member, means supporting said tone arm for lateral pivotal movement from a rest position adjacent the turntable whereby the tone arm head is positioned vertically above the peripheral edge of the record on the turntable, to a playing position over the turntable, tone arm restraining means coacting with said control member to hold said tone arm initially in said rest position and arranged to release said tone arm after said tone arm head has attained said playing relation, means including a cogwheel drivingly connected to the turntable, and a link adapted to be coupled between the control member and said cogwheel for returning the control member partially toward the rest position upon the completion of the record, means associated with the tone arm for effecting such coupling relation of the link, and means for effecting in timed sequence upon such partial return movement of said control member: elevation of the tone arm head above the record and pivoting of the tone arm laterally toward its rest position adjacent the turntable, said spring being operative to complete the return of said control member and said actuator to the rest position, said control member as an incident to such movement operating said switch assembly to de-energize the turntable motor, and said actuator being effective as an incident to such movement to displace the record partially from over the turntable to project the record through the slot in which it was originally inserted.

6. In a slot type record player having a motor driven record turntable and a tone arm, and adapted to receive a single record slid edgewise through the slot into playing position on the turntable, the combination comprising, a control member suspended below the turntable to pivot about a vertical axis and arranged to shift in a continuous movement in the same direction between a rest position and a playing position, an actuator rigidly carried by said control member, said actuator extending vertically adjacent the turntable while the control member occupies a rest position and positioned to be displaced laterally away from the turntable by the record to advance the control member toward its playing position as an incident to the record sliding into playing position on the turntable, means for accurately centering the record on the turntable and holding the record against lateral displacement operated by the control member as the latter shifts to the playing position, means for turning the turntable motor switch "on" and thus effecting the turntable to revolve operated by the control member, a tone arm head carried by the tone arm, means responsive to the movement of said control member for lowering said tone arm head into contact with the record, means supporting said tone arm for lateral pivotal movement from a rest position adjacent the turntable and over the edge of the record to a playing position over the turntable, means for restraining said tone arm against movement while the control member occupies a rest position, means releasing said tone arm operated by said control member as the latter shifts and in timed sequence following the lowering of said tone arm head into contact with the record responsive to the movement of said control member, whereby said tone arm may move laterally as the tone arm head follows the groove in the playing side of the record, means connected to said turntable motor for returning the control member to its rest position after the record has finished playing, means responsive to such return movement of the control member to raise the tone arm head from the record, means connected to said turntable motor for pivoting the tone arm laterally toward the rest position thereof adjacent the edge of the turntable effective as in incident to the return movement of the control member and in timed sequence following raising of the tone arm head, means for releasing the record by removing the centering means from operative engagement therewith responsive to the return movement of said control member, and means operated by said control member for latching the tone arm in the rest position thereof, said actuater being effective to displace the record partially from over the turntable to project through the slot in which it was originally inserted by engaging the edge of the record upon return of the control member to the rest position.

7. In a record player having a record turntable and a tone arm supported at one end for lateral pivotal movement from a rest position adjacent the turntable to a playing position over the turntable, the combination comprising, a tone arm head fixed on the tone arm for pivotal rocking movement about a traverse axis between an elevated position over a record on the turntable and a record playing position, said axis being located intermediate the ends of said tone arm head, resilient means connected to the tone arm and head for urging said tone arm head toward record playing relation with the record on the turntable, said resilient means tending to restrict upward movement of said tone arm head while the record is playing, and means including a lever movably mounted on said tone arm and connected to said tone arm head so as to rigidly control the downward movement of the latter responsive to the force of said resilient means, said lever providing for raising said tone arm head away from record playing position, and a member for moving said lever associated with the pivotal support for the tone arm.

8. In a record player having a record turntable and a tone arm, said tone arm being supported at one end for lateral pivotal movement from a rest position adjacent the turntable to a playing position over the turntable, the combination comprising, an actuator for operating the record player and having rest and playing positions, a tone arm head mounted on the tone arm to be pivotable between a record playing position and an elevated position above the record, said tone arm head being located in an elevated position while the actuator occupies its rest position, means resiliently urging said tone arm head toward record playing position, tone arm restraining means coacting with said actuator to hold said tone arm initially in said rest position adjacent the turntable wherein the tone arm head is positioned vertically above the peripheral edge of a record centered on the turntable, means including a lever mounted on the tone arm for pivoting said tone arm head against the force of said resilient means, and a member for moving said lever associated with the pivotal support for the tone arm and operated by said actuator as an incident to initial advance of the actuator toward the playing position thereof for lowering said tone arm head at a controlled rate into playing relation with the record under the urging of said resilient means while said tone arm is in said rest position, said restraining means in said actuator being arranged to release said tone arm for travel across the record side upon further movement of said actuator and after said tone arm head has attained said playing relation, said resilient means tending to restrict upward movement of said tone arm head while the record is playing.

9. In a record player having a record turntable and a tone arm for playing the record, and adapted to receive a single record slid edgewise into playing position on the turntable, said tone arm head being supported at one end solely for lateral pivotal movement from a rest position adjacent the turntable, to a playing position over the turntable, the combination comprising, an actuator disposed in the path of movement of the record and arranged to advance in a continuous movement in the same direction between a rest and a playing position and to return to the rest position, said actuator being adapted to be advanced partially toward its playing position by the record as it is inserted over the turntable, means for completing the advance of said actuator to the playing position, a tone arm head pivotally mounted on the tone arm for rocking movement between a record playing position and an elevated position above the record, means including a lever mounted on the tone arm for pivoting said tone arm head to said elevated position, a member for moving said lever associated with the pivotal support for the tone arm and connected to said actuator for lowering said tone arm head into record playing relation with the record at a controlled rate effective as an incident to advance of the actuator toward the playing position under the urging of the record.

10. In a record player having a record turntable and a tone arm for playing the record, and adapted to receive a single record slid edgewise into playing position on the turntable, the combination comprising, an actuator disposed in the path of movement of the record and arranged to advance and return in a continuous movement in the same direction between a rest and a playing position, said actuator in the playing position being free from engagement with the record, said actuator being adapted to be advanced partially toward the playing position by the record as it is inserted over the turntable, said turntable having a recess in the center thereof, a record centering assembly mounted in said turntable recess for movement between a lowered position whereby said assembly is disposed out of operative engagement with a record on the turntable and a raised position, whereby said assembly is located in the center hole of a record on the turntable for centering the same, means resiliently urging said record centering assembly toward said raised position, a tone arm head pivotally carried by the tone arm for movement between an elevated position out of operative relation with the record on the turntable and a lowered record engaging position, means resiliently urging said tone arm head toward record engaging position, link means connected to said actuator and said record centering assembly for lowering the latter against the force of said first mentioned resilient means and for controlling the raising of said record centering assembly into centering position under the urging of said first mentioned resilient means, and lever means carried by said tone arm and connected to said actuator and said tone arm head for pivoting the latter toward its elevated position against the force of said second mentioned resilient means, both said lever means and said link means being effective as an incident to advance movement of the actuator toward the playing position, whereby said resilient means associated with the record centering assembly and the tone arm head respectively, operatively assist the completion of the advance of the actuator to the playing position.

11. In a slot type record player having a motor driven record turntable and a tone arm means for playing the record, and adapted to receive a single record slid edgewise and horizontally through the slot into playing position over the turntable, the combination comprising, an actuator disposed in the path of movement of the record and arranged to advance in a horizontal path for at least a portion of its movement between a rest and a playing position, with said actuator positioned to be advanced initially toward its playing position by the record as it is inserted over the turntable, means independent of the turntable motor for completing the advance of said actuator to the playing position, said actuator being returnable from its playing to its rest position via a path such that said actuator engages the record displacing the same from over the turntable and through the slot in which it was originally inserted, switch means operated by said actuator in the course of such initial advance movement to start the turntable motor, means operated by said actuator for entering said tone arm means into playing relation with the record on the turntable, means for connecting said turntable motor to said actuator after the record has finished playing for automatically returning the actuator to the rest position, manually operated means for connecting said turntable motor to said actuator for returning the actuator to the rest position while the record is playing, said actuator being operative in the course of such return movement to remove the tone arm means from playing relation with the record and having means to stop the turntable motor.

12. In a motor driven slot type record player having a record turntable and at one arm for playing the record, and adapted to receive a single record slid edgewise through the slot into playing position on the turntable, the combination comprising, a control member comprising a flat plate suspended below the turntable to pivot about a vertical axis and arranged to advance and return in a continuous horizontal path in the same direction between a rest and a playing position, an actuator disposed in the path of movement of the record and connected to the control member for advancing the same toward the playing position, said actuator having corresponding rest and playing positions and being adapted to advance the control member partially toward its playing position as a consequence of engagement by the record as it is inserted over the turntable, resilient means operatively connected to said control member for completing the advance of said member to the playing position independently of said turntable motor, a motor switch assembly, said switch assembly being mounted for engagement by said control member as an incident to advance thereof toward the playing position thus effecting the turntable to revolve, a record centering assembly carried by the turntable, said record centering assembly including a centering element for insertion in the center hole of the record, a spring biasing the centering element vertically, and a lever connected to the control member, and operative to center the record on the turntable in playing position as the control member advances to the playing position under the influence of said resilient means, a tone arm head carried by the tone arm, resilient means operatively connected to said tone arm head for effecting engagement of said tone arm head with the record upon advance movement of the control member and in timed sequence following operation of said record centering assembly, said spring biasing said record centering assembly being effective to assist the control member in completing its movement to the playing position, means supporting said tone arm for lateral pivotal movement from a rest position adjacent the turntable and with the tone arm head over the edge of the record to a playing position over the turntable, and means connected to said motor for returning the control member to the rest position after the record has finished playing whereby the actuator engages the record to displace the latter partially from over the turntable.

13. In a record player having a record turntable and a tone arm having a tone arm head with stylus, said tone arm being supported at one end about a vertical support solely for lateral pivotal movement from a rest position adjacent the turntable to a playing position over the turnable, the improvement comprising, means providing a pivotal mounting on a transverse axis for said tone arm head whereby said head is supported solely for pivotal rocking movement within the tone arm between an elevated position over a record on the turntable and a record playing position wherein said stylus rides in the record groove, a spring urging said tone arm head toward record playing position, and means for pivotally moving said tone arm head to elevate the latter in opposition to said spring and to lower said tone arm head into record playing relation including an arm fastened to said head and extending lengthwise of said tone arm, said head being so arranged that the mass thereof is distributed on both sides of the axis of support of the head for counterbalancing purposes, said spring limiting relative vertical movement of said tone arm head and record while the record is playing, a bar pivotally carried by a horizontal pivotal support on said tone arm and having one end engaging said arm and having the other end at said vertical support, and means associated with said vertical support for said tone arm for moving the said other end of said bar vertically to pivot the tone arm head.

14. In a record player having a record turntable the combination comprising, a tone arm having a tone arm head with stylus, said tone arm including an inverted U-shaped channel member supported at one end solely for lateral pivotal movement from a rest position adjacent the turntable to a playing position over the turntable, means providing a pivotal mounting for said tone arm head at the other end between the side walls of said channel member whereby said head is supported solely for pivotal rocking movement within the tone arm between an elevated position over a record on the turntable and a record playing position wherein said stylus rides in the record groove, a spring connected to said channel member and urging said tone arm head toward record playing position, means for pivotally elevating said tone arm head in opposition to said spring including an arm fastened to said head and extending lengthwise of said tone arm channel member toward the supported end thereof, a bar pivotally mounted between the side walls of said channel member on a transverse axis spaced from said transverse axis of support of said head and having one end engaging the arm fastened to said tone arm head, with said bar positioned to press down on said arm to elevate said head upon pivotal movement in one direction, said bar having its other end extending to the supported end of said tone arm, and means associated with the support for said tone arm for engaging and moving the said other end of said bar vertically to pivot the same in the said one direction.

15. In a record player having a record turntable and a tone arm having a tone arm head with stylus, the combination comprising, means for supporting said tone arm at one end solely for lateral pivotal movement from a rest position adjacent the turntable to a playing position over the turntable, means providing a pivotal mounting for said tone arm head whereby said head is supported solely for pivotal rocking movement within the tone arm between an elevated position over the record on the turntable and a record playing position wherein said stylus rides in the record groove, resilient means urging said tone arm head toward record playing position, means for pivotally elevating said tone arm head in opposition to said resilient means including a member pivotally mounted within said tone arm on a transverse pivotal axis and extending lengthwise of said tone arm, said member having one end operatively engaging said tone arm head, and having its other end located adjacent said support means for said tone arm, said member effecting elevation of said head upon pivotal movement in one direction, and means associated with the support for said tone arm for pivoting said member in said one direction, the pivotal axis of said member being located lengthwise thereof such as to provide a mechanical advantage greater than 1 in the elevation of the tone arm head by said last named means.

16. In a record player having a record turntable and a tone arm for playing the record, and adapted to receive a single record slid edgewise into playing position on the turntable, said tone arm being supported at one end solely for lateral pivotal movement from a rest position adjacent the turntable to a playing position over the turntable, the combination comprising, an actuator disposed in the path of movement of the record and arranged to advance and return between a rest and a playing position, said actuator being adapted to be advanced by the record toward the playing position as it is inserted over the turntable, a tone arm head mounted on the tone arm solely for vertical rocking movement between a record playing position and an elevated position above the record, means resiliently urging said tone arm head toward the record playing position, means including a lever mounted on the tone arm for pivoting said tone arm head against the force of said resilient means and away from record playing position, and a member for moving said lever associated with the pivotal support for the tone arm and connected to said actuator, said actuator having means arranged to operate said member as it advances toward the playing position for lowering said tone arm head at a controlled rate into playing relation with the record on the turntable under the urging of said resilient means.

17. In a record player having a motor driven record turntable and a tone arm for playing the record, and adapted to receive a single record slid edgewise into playing position on the turntable, the combination comprising, an actuator disposed in the path of movement of the record and movable through a continuous path in the same direction between rest and playing positions, said actuator in the playing position being free from engagement with the record, with said actuator positioned to be advanced partially toward the playing position by the record as it is inserted over the turntable, spring means for completing the advance of said actuator to the playing position independently of the operation of said turntable motor, a turntable motor switch assembly, a record centering assembly, and means for coupling said actuator to said turntable motor switch assembly and said record centering assembly for operating the same in sequence as an incident to advance movement of the actuator toward playing position in this order with a discrete interval between each operation (1) energizing the turntable motor to revolve the turntable and (2) moving said centering assembly into operative relation with the record to accurately center the record on the turntable and hold the record against lateral displacement therefrom, said tone arm having a rest position with its free end over the edge of a record centered on the turntable, tone arm restraining means for holding said tone arm in said rest position, and means operated by said actuator for movement independently of said turntable motor to release said restraining means after said centering assembly is in operative relation with the record.

References Cited in the file of this patent

UNITED STATES PATENTS

| | | |
|---|---|---|
| 1,517,690 | Abt | Dec. 2, 1924 |
| 1,895,126 | Hilgenberg | Jan. 24, 1933 |
| 2,100,686 | Collaro et al. | Nov. 30, 1937 |
| 2,375,658 | Johnson | May 8, 1945 |
| 2,485,575 | Deaver | Oct. 25, 1949 |
| 2,506,692 | Thompson | May 9, 1950 |

FOREIGN PATENTS

| | | |
|---|---|---|
| 267,728 | Switzerland | July 1, 1950 |

UNITED STATES PATENT OFFICE
CERTIFICATION OF CORRECTION

Patent No. 3,004,764 October 17, 1961

Marcel Jules Helene Staar

It is hereby certified that error appears in the above numbered patent requiring correction and that the said Letters Patent should read as corrected below.

Column 12, line 69, strike out "the", second occurrence; column 19, line 66, for "at one" read -- a tone --.

Signed and sealed this 3rd day of April 1962.

(SEAL)
Attest:

ERNEST W. SWIDER
Attesting Officer

DAVID L. LADD
Commissioner of Patents